US011576118B1

(12) United States Patent
Maggi et al.

(10) Patent No.: US 11,576,118 B1
(45) Date of Patent: Feb. 7, 2023

(54) OPTIMIZING USAGE OF POWER USING SWITCH OFF OF CELLS

(71) Applicant: NOKIA SOLUTIONS AND NETWORKS OY, Espoo (FI)

(72) Inventors: Lorenzo Maggi, Paris (FR); Alvaro Valcarce Rial, Saint-Cloud (FR); Claudiu Mihailescu, Versailles (FR); Maunu Elias Holma, Helsinki (FI); Afef Feki, Sceaux (FR)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/878,554

(22) Filed: Aug. 1, 2022

(30) Foreign Application Priority Data

Aug. 4, 2021 (FI) .................................... 20215835

(51) Int. Cl.
*H04W 52/02* (2009.01)
*H04W 48/06* (2009.01)

(52) U.S. Cl.
CPC .............................. *H04W 52/0203* (2013.01)

(58) Field of Classification Search
CPC . H04W 52/0203; H04W 24/02; H04W 24/08; H04W 28/0231; H04W 28/0804; Y02D 30/70
See application file for complete search history.

(56) References Cited

U.S. PATENT DOCUMENTS

| 8,849,346 | B2* | 9/2014 | Jorguseski | H04W 24/02 455/553.1 |
|---|---|---|---|---|
| 9,071,939 | B2* | 6/2015 | Hategan | G06Q 30/0259 |
| 9,844,002 | B2* | 12/2017 | Caretti | H04W 52/0232 |
| 10,548,077 | B2* | 1/2020 | Suerbaum | H04W 52/0203 |
| 10,856,191 | B1* | 12/2020 | Virtej | H04W 76/27 |
| 11,452,032 | B2* | 9/2022 | Gupta | H04W 68/005 |
| 2019/0349773 | A1 | 11/2019 | Mwanje et al. | |
| 2020/0187113 | A1* | 6/2020 | Mwanje | H04W 28/0257 |

(Continued)

FOREIGN PATENT DOCUMENTS

CN 102316512 B * 6/2016
CN 103906211 B * 7/2017

(Continued)

OTHER PUBLICATIONS

Office Action dated Feb. 15, 2022 corresponding to Finnish U.S. Appl. No. 20/215,835.

(Continued)

*Primary Examiner* — Ahmed Elallam
(74) *Attorney, Agent, or Firm* — Squire Patton Boggs (US) LLP

(57) ABSTRACT

Disclosed is a method comprising obtaining historical data from a plurality of access nodes comprised in a network, determining, for at least one of the plurality of access nodes, a region comprising a set of values for threshold pairs that comprise minimum and maximum threshold pairs, determining, from the region, one threshold pair, wherein the threshold pair defines pre-determined thresholds for determining if a cell is to be switched on or switched off, providing the threshold pair to the network for deployment, and collecting data regarding at least one key performance indicator from the plurality of access nodes.

20 Claims, 9 Drawing Sheets

(56) References Cited

U.S. PATENT DOCUMENTS

2021/0227461 A1* 7/2021 Zhou ................. H04W 52/0206
2022/0225127 A1* 7/2022 Imran .................... G06N 7/005

FOREIGN PATENT DOCUMENTS

| CN | 109 803 285 | A | | 5/2019 | | |
|----|-------------|---|---|--------|---|---|
| CN | 112312531 | A | * | 2/2021 | | |
| CN | 112153654 | B | * | 3/2022 | ............ | H04W 16/18 |
| CN | 112367697 | B | * | 7/2022 | ............ | H04W 24/02 |
| EP | 2919531 | A1 | | 9/2015 | | |
| JP | 2011186871 | A | * | 9/2011 | | |
| WO | 2020/073893 | A1 | | 4/2020 | | |
| WO | 2021/011131 | A1 | | 1/2021 | | |

OTHER PUBLICATIONS

Finnish Search Report dated Feb. 15, 2022 corresponding to Finnish U.S. Appl. No. 20/215,835.

Communication of Acceptance—section 29 a of Patents Decree dated Jun. 20, 2022 corresponding to Finnish Patent Application No. 20215835.

B. Balasubramanian et al.., "RIC: A RAN Intelligent Controller Platform for AI-Enabled Cellular Networks," IEEE Internet Computing, vol. 25, No. 2, Mar. 11, 2021.

Extended European Search Report dated Nov. 24, 2022 corresponding to European Patent Application No. 22178607.2.

Yin Gao et al., "Machine Learning based Energy Saving Scheme in Wireless Access Networks," 2020 International Wireless Communications and Mobile Computing (IWCMC), IEEE, Jun. 15, 2020, pp. 1573-1578, XP033799865.

* cited by examiner

OPTIMIZING USAGE OF POWER USING SWITCH OFF OF CELLS

FIELD

The following exemplary embodiments relate to wireless communication and saving energy consumed within a cellular communication network.

BACKGROUND

Cellular communication networks comprise capacity that is capable of handling communication during peak hours. Yet, the resources required to handle peak hours may not be needed all the time. Thus, to optimize the operating hours of the resources may help to reduce the energy required by the network.

BRIEF DESCRIPTION

The scope of protection sought for various embodiments of the invention is set out by the independent claims. The exemplary embodiments and features, if any, described in this specification that do not fall under the scope of the independent claims are to be interpreted as examples useful for understanding various embodiments of the invention.

According to a first aspect there is provided an apparatus comprising means for: obtaining historical data from a plurality of access nodes comprised in a network, determining, for at least one of the plurality of access nodes, a region comprising a set of values for threshold pairs that comprise minimum and maximum threshold pairs, determining, from the region, one threshold pair, wherein the threshold pair defines pre-determined thresholds for determining if a cell is to be switched on or switched off, providing the threshold pair to the network for deployment, and collecting data regarding at least one key performance indicator from the plurality of access nodes.

According to a second aspect there is provided an apparatus comprising at least one processor, and at least one memory including a computer program code, wherein the at least one memory and the computer program code are configured, with the at least one processor, to cause the apparatus to: obtain historical data from a plurality of access nodes comprised in a network, determine, for at least one of the plurality of access nodes, a region comprising a set of values for threshold pairs that comprise minimum and maximum threshold pairs, determine, from the region, one threshold pair, wherein the threshold pair defines pre-determined thresholds for determining if a cell is to be switched on or switched off, provide the threshold pair to the network for deployment, and collect data regarding at least one key performance indicator from the plurality of access nodes.

According to a third aspect there is provided a method comprising obtaining historical data from a plurality of access nodes comprised in a network, determining, for at least one of the plurality of access nodes, a region comprising a set of values for threshold pairs that comprise minimum and maximum threshold pairs, determining, from the region, one threshold pair, wherein the threshold pair defines pre-determined thresholds for determining if a cell is to be switched on or switched off, providing the threshold pair to the network for deployment, and collecting data regarding at least one key performance indicator from the plurality of access nodes.

According to a fourth aspect there is provided a computer program product comprising instructions for causing an apparatus to perform at least the following: obtain historical data from a plurality of access nodes comprised in a network, determine, for at least one of the plurality of access nodes, a region comprising a set of values for threshold pairs that comprise minimum and maximum threshold pairs, determine, from the region, one threshold pair, wherein the threshold pair defines pre-determined thresholds for determining if a cell is to be switched on or switched off, provide the threshold pair to the network for deployment, and collect data regarding at least one key performance indicator from the plurality of access nodes.

According to a fifth aspect there is provided a computer program comprising instructions for causing an apparatus to perform at least the following: obtain historical data from a plurality of access nodes comprised in a network, determine, for at least one of the plurality of access nodes, a region comprising a set of values for threshold pairs that comprise minimum and maximum threshold pairs, determine, from the region, one threshold pair, wherein the threshold pair defines pre-determined thresholds for determining if a cell is to be switched on or switched off, provide the threshold pair to the network for deployment, and collect data regarding at least one key performance indicator from the plurality of access nodes.

According to a sixth aspect there is provided a non-transitory computer readable medium comprising program instructions for causing an apparatus to perform at least the following: obtain historical data from a plurality of access nodes comprised in a network, determine, for at least one of the plurality of access nodes, a region comprising a set of values for threshold pairs that comprise minimum and maximum threshold pairs, determine, from the region, one threshold pair, wherein the threshold pair defines pre-determined thresholds for determining if a cell is to be switched on or switched off, provide the threshold pair to the network for deployment, and collect data regarding at least one key performance indicator from the plurality of access nodes.

According to a seventh aspect there is provided a non-transitory computer readable medium comprising program instructions stored thereon for performing at least the following: obtain historical data from a plurality of access nodes comprised in a network, determine, for at least one of the plurality of access nodes, a region comprising a set of values for threshold pairs that comprise minimum and maximum threshold pairs, determine, from the region, one threshold pair, wherein the threshold pair defines pre-determined thresholds for determining if a cell is to be switched on or switched off, provide the threshold pair to the network for deployment, and collect data regarding at least one key performance indicator from the plurality of access nodes.

LIST OF DRAWINGS

In the following, the invention will be described in greater detail with reference to the embodiments and the accompanying drawings, in which FIG. 1 illustrates an exemplary embodiment of a radio access network.

DESCRIPTION OF EMBODIMENTS

Figure 1:
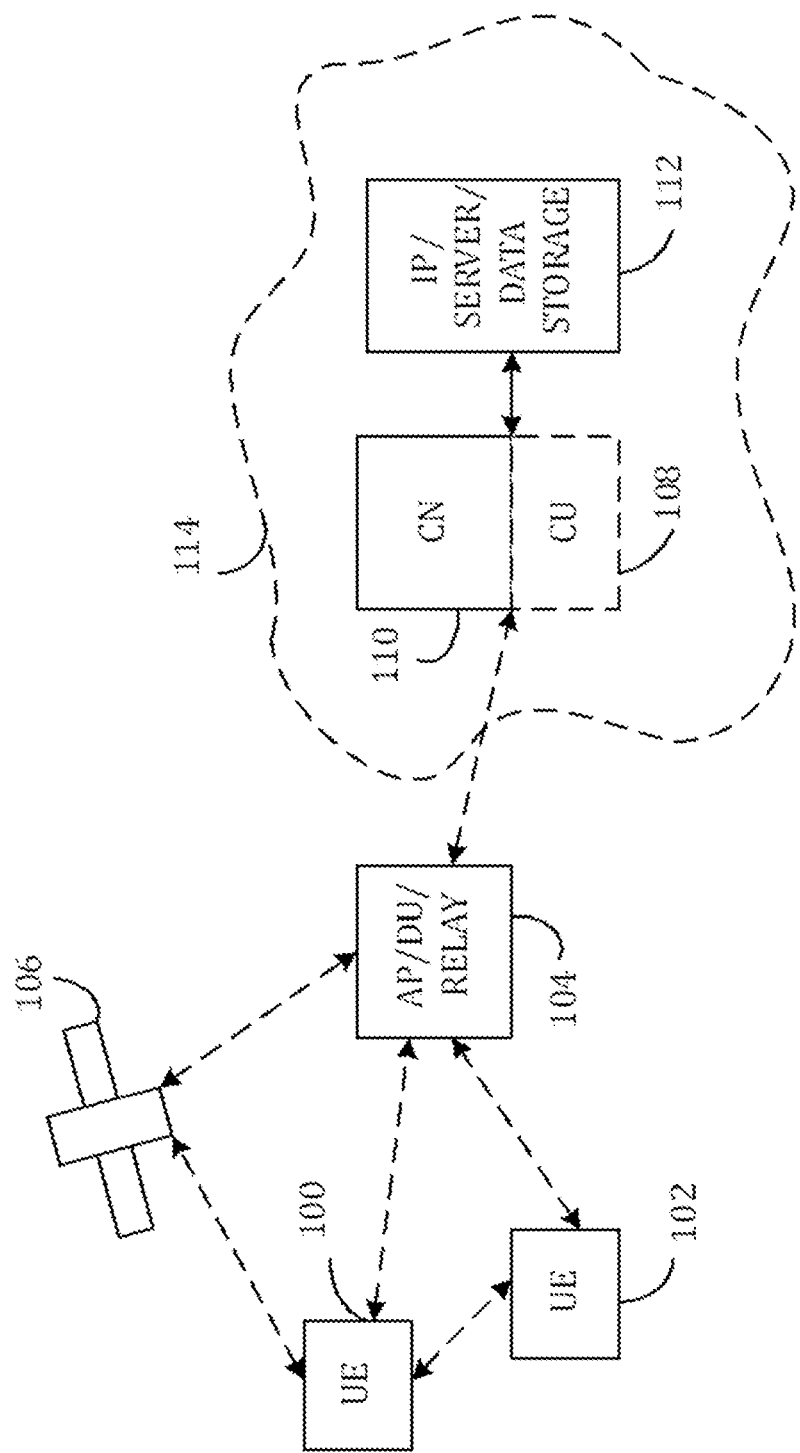

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. The above-described embodiments of the circuitry may also be considered as embodiments that provide means for carrying out the embodiments of the methods or processes described in this document.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via any suitable means. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments described herein may be implemented in a communication system, such as in at least one of the following: Global System for Mobile Communications (GSM) or any other second generation cellular communication system, Universal Mobile Telecommunication System (UMTS, 3G) based on basic wideband-code division multiple access (W-CDMA), high-speed packet access (HSPA), Long Term Evolution (LTE), LTE-Advanced, a system based on IEEE 802.11 specifications, a system based on IEEE 802.15 specifications, and/or a fifth generation (5G) mobile or cellular communication system. The embodiments are not, however, restricted to the system given as an example but a person skilled in the art may apply the solution to other communication systems provided with necessary properties.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may comprise also other functions and structures than those shown in FIG. 1. The example of FIG. 1 shows a part of an exemplifying radio access network.

FIG. 1 shows terminal devices 100 and 102 configured to be in a wireless connection on one or more communication channels in a cell with an access node (such as (e/g)NodeB) 104 providing the cell. The access node 104 may also be referred to as a node. The physical link from a terminal device to a (e/g)NodeB is called uplink or reverse link and the physical link from the (e/g)NodeB to the terminal device is called downlink or forward link. It should be appreciated that (e/g)NodeBs or their functionalities may be implemented by using any node, host, server or access point etc. entity suitable for such a usage. It is to be noted that although one cell is discussed in this exemplary embodiment, for the sake of simplicity of explanation, multiple cells may be provided by one access node in some exemplary embodiments.

A communication system may comprise more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The (e/g)NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side may be a serving gateway (S-GW, routing and forwarding user data packets), packet data network gateway (P-GW), for providing connectivity of terminal devices (UEs) to external packet data networks, or mobile management entity (MME), etc.

The terminal device (also called UE, user equipment, user terminal, user device, etc.) illustrates one type of an apparatus to which resources on the air interface are allocated and assigned, and thus any feature described herein with a terminal device may be implemented with a corresponding apparatus, such as a relay node. An example of such a relay node is a layer 3 relay (self-backhauling relay) towards the base station. Another example of such a relay node is a layer 2 relay. Such a relay node may contain a terminal device part and a Distributed Unit (DU) part. A CU (centralized unit) may coordinate the DU operation via HAP -interface for example.

The terminal device may refer to a portable computing device that includes wireless mobile communication devices operating with or without a subscriber identification module (SIM), or an embedded SIM, eSIM, including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be an exclusive or a nearly exclusive uplink only device, of which an example is a camera or video camera loading images or video clips to a network. A terminal device may also be a device having capability to operate in Internet of Things (IoT) network which is a scenario in which objects are provided with the ability to transfer data over a network without requiring human-to-human or human-to-computer interaction. The terminal device may also utilise cloud. In some applications, a terminal device may comprise a small portable device with radio parts (such as a watch, earphones or eyeglasses) and the computation is carried out in the cloud. The terminal device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G may require bringing the content close to the radio which may lead to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, and/or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology that may be used includes for example Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling or service availability in areas that do not have terrestrial coverage. Possible use cases comprise providing service continuity for machine-to-machine (M2M) or Internet of Things (IoT) devices or for passengers on board of vehicles, and/or ensuring service availability for critical communications, and/or future railway/maritime/aeronautical communications. Satellite communication may utilise geostationary earth orbit (GEO) satellite systems, but also low earth orbit (LEO) satellite systems, for example, mega-constellations (systems in which hundreds of (nano) satellites are deployed). A satellite 106 comprised in a constellation may carry a gNB, or at least part of the gNB, that create on-ground cells. Alternatively, a satellite 106 may be used to relay signals of one or more cells to the Earth. The on-ground cells may be created through an on-ground relay node 104 or by a gNB located on-ground or in a satellite or part of the gNB may be on a satellite, the DU for example, and part of the gNB may be on the ground, the CU for example. Additionally, or alternatively, high-altitude platform station, HAPS, systems may be utilized. HAPS may be understood as radio stations located on an object at an altitude of 20-50 kilometres and at a fixed point relative to the Earth. Alternatively, HAPS may also move relative to the Earth. For example, broadband access may be delivered via HAPS using lightweight, solar-powered aircraft and airships at an altitude of 20-25 kilometres operating continually for several months for example.

It is to be noted that the depicted system is an example of a part of a radio access system and the system may comprise a plurality of (e/g)NodeBs, the terminal device may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In some exemplary embodiments, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. A network which is able to use "plug-and-play" (e/g)NodeBs, may include, in addition to Home (e/g)NodeBs (H(e/g)nodeBs), a home node B gateway, or HNB-GW (not shown in FIG. 1). A HNB Gateway (HNB-GW), which may be installed within an operator's network may aggregate traffic from a large number of HNBs back to a core network.

Cellular communication networks consume significant amounts of energy. For example, energy consumption of a 4G Radio Access Network (RAN) may account for 20-25% of the network Total Cost of Ownership (TCO). Also, the energy needs of cellular communication networks in future may increase due to increased cellular densities, massive MIMO and further advances. In a RAN, a significant amount of the energy consumed is due to the access nodes comprised in the RAN. The access nodes comprise Power Amplifiers (PAs) that use much of that energy and also baseband processing and switching require energy. To address the energy consumption would therefore be beneficial. One aspect from which the situation can be addressed is to monitor usage of Physical Resource Block (PRB). For example, the PRB utilization may be monitored on a group of cells known as the Power Savings Group (PSG). If the PRB utilization drops below a pre-configured threshold, one or more cells may be switched off using a graceful shutdown procedure. The cells may then be switched back on when the PRB utilization grows above another pre-configured threshold. For example, the cells may be switched off during the night.

Figure 2:
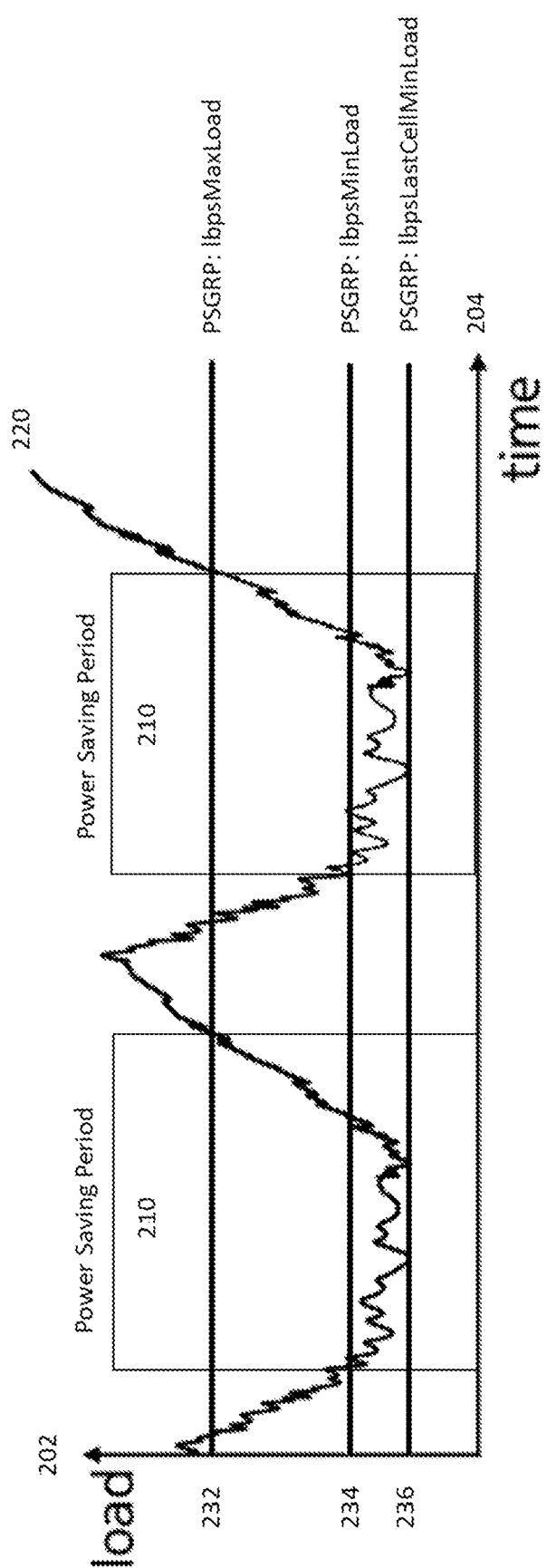
FIG. 2 illustrates an example of tracking traffic load and applying pre-configured thresholds.

FIG. 2 illustrates an example of tracking traffic load and applying pre-configured thresholds to trigger energy saving by switching off cells and switching those on again once the traffic load increases above a pre-configured threshold. The illustration is in terms of traffic load 202 and time 204. The curve 220 illustrates the tracked traffic load. The pre-configured thresholds are 232, which illustrates maximum load threshold for a power saving group of cells, threshold 234, which illustrates a minimum load for the power saving group of cells and the threshold 236 illustrates the minimum load for the last switched-on cell within the pawer saving group of cells. As can be seen from the FIG. 2, there are two power-saving periods 210 that occur when the traffic load is below the pre-configured threshold 232.

The power-saving periods may thus be considered as identified opportunity windows (OW) during which energy savings may be obtained. These periods may occur for example during nighttime. As such, a pair of load thresholds $\rho_{min}$, $\rho_{max}$ may be defined within the OW, and cells within the same Power Saving Group (PSG) may be switched on/off for example according to the following manner: if the current PRB utilization<$\rho_{min}$ for a given number of consecutive measurements, such as occurring each 10 secs, and the predicted load after switch off is lower than $\rho_{max}$, then a cell is switched off. On the other hand, if the current PRB utilization>$\rho_{max}$ for a certain number of consecutive measurements, such as occurring each 10 secs, then a cell is switched on. The order in which cells within the same PSG are switched on/off may be predefined or it may be determined according to any other suitable criteria.

As a cell is switched-off, the power amplifiers of the cell are consequently disabled, which has a benefit of saving energy. Yet, this action may also have consequences to the network, such as inducing an increase of PRB utilization on remaining cells. During the procedure of switching-off a cell, terminal devices connected to the cell are handed over to neighboring cells within the same PSG. This may reduce the throughput of all terminal devices, because as PRB utilization per cell increases, the average throughput perceived by the terminal devices may decrease.

Thus, when determining the pre-configured threshold values, those should be determined such that the highest energy savings are obtained while avoiding QoS degradation to the terminal devices and frequent cell shutdowns. Additionally, there may be further objectives such as avoiding too frequent cell shutdown/power-up that may jeopardize the network stability and induce too frequent handovers. Thus, for each PSG it may be desirable to determine a pair of thresholds, that is $\rho_{min}$, $\rho_{max}$ that achieve:

$$\max_{\rho \in \mathcal{R}} \text{ energy saved}(\rho) \quad (ES)$$
$$\text{s.t. } Pr(\text{avg } UE \text{ throughput}(\rho) > Y \text{ Mbps}) > X$$

where $\mathcal{R}$ is the set of all admissible thresholds:

$$\mathcal{R} = \{\rho = [\rho_{min}, \rho_{max}]: 0 < \rho_{min} \rho_{max} < 100\}$$

and the value of X, Y may be configured to be for example Y32 4, X=0.95. Therefore, the optimization of pre-configured thresholds ($\rho_{min}$, $\rho_{max}$) for each PSG such that it maximizes the saved energy while guaranteeing a minimum experienced throughput for terminal devices is desirable.

In order to optimize the values that can then be used to determine the pre-configured thresholds, which may also be referred to as pre-determined thresholds, a combination of offline and online optimization may be utilized. Offline optimization may be understood as optimization that may require measurements from a live network, but it does not cause any configuration changes to the live network and thus the offline optimization may be performed without disturbing the network and/or impacting key performance indicators of the network. Online optimization may be understood as optimization that may be done by configuring the live network and measuring the outcome, which may disturb the network and/or impact key performance indicators of the network. The network may be a cellular communication network comprising a plurality of access nodes. As part of the offline optimization, a search of p may be delimited to a limited and safe search region, which may be referred to as a segment. Once the segment is determined, then as part of online optimization a selection of threshold values, that are pre-determined threshold values, may be fine-tuned within the determined segment. After the threshold values have been determined, then a constraint regarding the minimum throughput that is to be experienced by a terminal device that is served by the network may be fine-tuned in the online optimization. It is to be noted that the constrain can already be taken into account in order to determine the threshold segment in the offline optimization. This may be done for example by having the threshold values integrated as an energy saving xApp.

Figure 3:
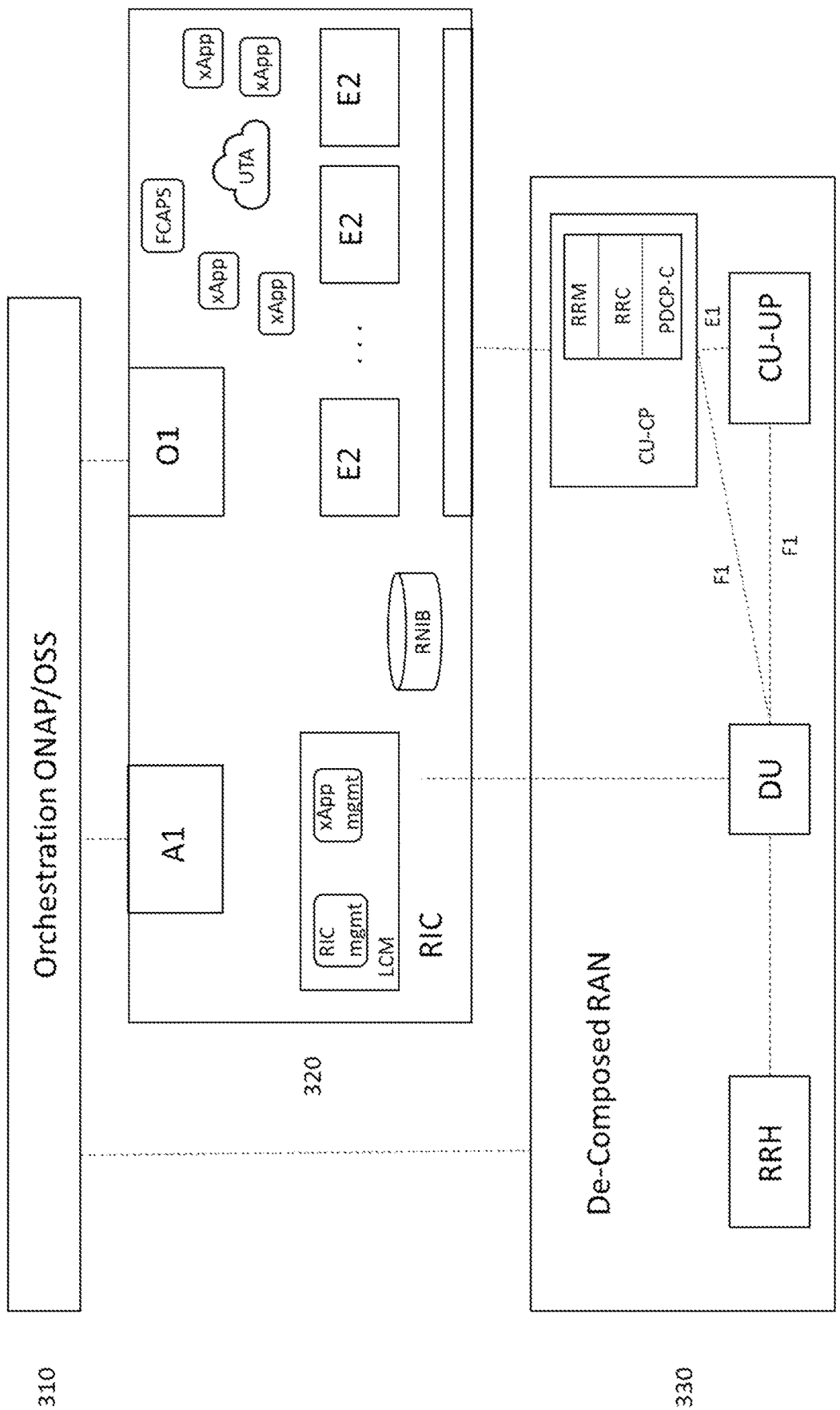
FIG. 3 illustrates an exemplary embodiment of a network architecture in which the optimization takes place.

FIG. 3 illustrates an exemplary embodiment of a network architecture in which the optimization takes place. In this exemplary embodiment, there is Orchestration 310 which may comprise Open Network Automation Platform (ONAP) and/or Operations Support System (OSS). The orchestration 310 is then connected to a RIC 320 and to a De-composed RAN 330. The RIC 310 may then run the optimization of the threshold values as an xAPP. The RIC 310 may have interfaces A1 and O1 to connect to the orchestration 310 and interfaces E2 to connect to the Central Unit Control Plane (CU-CP) of the de-composed RAN 330. The de-composed RAN may further comprise remote radio head (RRM), a distributed unit (DU) and central unit user plane (CU-CP).

Figure 4:
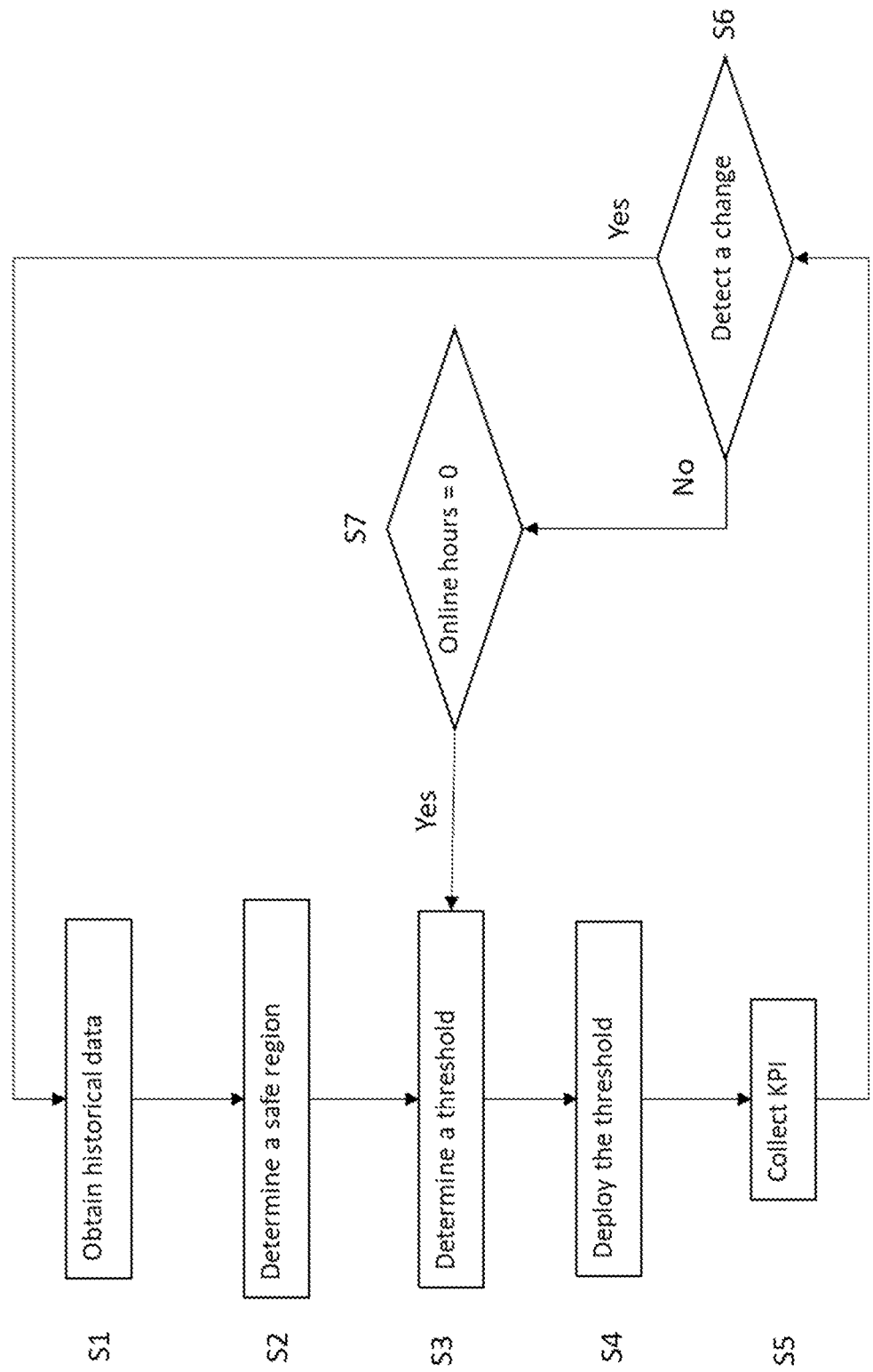
FIG. 4 illustrates a flow chart according to an exemplary embodiment for optimizing threshold values.

FIG. 4 illustrates a flow chart according to an exemplary embodiment for optimizing the threshold values. In this exemplary embodiment, the optimization begins in step 1, S1, in which an Over-the-Top (OTT) node, such as a RIC, performs collecting historical data from several different PSGs. The historical data may comprise cell-level information that is collected for a certain period of time, such as for two weeks. As such, the historical data may be collected from a plurality of access nodes comprised in a network. The collected data may comprise data metric, for example average throughput for a terminal device, PRB utilization, carrier frequency, average Channel Quality Indicator (CQI) and/or time stamps of time window, such as time window of 15 minutes, over which the data metrics are averaged.

Next, in step 2, S2, the OTT node determines, for example by computing, a threshold region $\mathcal{R}_g$ for each PSG g, that may then be fine-tuned later on for example using an online exploration. The region $\mathcal{R}_g$ may be defined as a set of threshold pairs $\rho_{min}$, $\rho_{max}$. The determined threshold region $\mathcal{R}_g$ may be considered as a safe region and it may be determined for example by searching a 1-D line.

The safe search region $\mathcal{R}_g$ may have the following properties: it is 1 dimensional, for example, it can be parameterized by a single real value r∈[0;1] and/or minimum and maximum thresholds $\rho_{min}$ and $\rho_{max}$ are non-increasing variables on r.

It is to be noted that steps 1 and 2 may be performed offline. This offline phase may be performed at certain time intervals, for example after certain number of weeks and the time interval may be denoted as $T_{offline}$ [weeks]. This allows to obtain new data for determining a new safe search region $\mathcal{R}_h$. The re-do of these offline steps may be determined by a user, in other words, manually, or after a triggering event has been detected. A triggering event may be for example such that online exploration is stuck at either of the two extremes such as low or high thresholds, meaning that most likely the optimal point is beyond the search region which then needs to be recomputed and/or CQI histogram changes drastically, due to for example construction of a new building.

It is to be noted that step 2 may restrict the threshold search region from the region of all admissible thresholds. For example, from $$\mathcal{R} = \{\rho = [\rho_{min}, \rho_{max}]: 0 < \rho_{min} \leq \rho_{max} < 100\}$$

to a safe region $\mathcal{R}_g$ which is a subset of $\mathcal{R}$. It is to be noted that the region may be determined individually for at least one access node, or individually for each of the access nodes, that are comprised in the plurality of access nodes comprised in the network. The safe search region $\mathcal{R}_g$ has, in this exemplary embodiment, the following properties: $\mathcal{R}_g$ is a 1-dimensional line and it can may be parameterized by a single real value r∈[0; 1]; and minimum and maximum thresholds $\rho_{min}$ and $\rho_{max}$ both increase, that is, do not decrease as r increases from 0 to 1. In other words, the safe region may be considered as a subset of all admissible thresholds and the subset comprises elements that are sortable such that the minimum and maximum thresholds are both non-decreasing.

It is also to be noted that in step 2 the OTT node may retrieve, for a specific PSG g, historical data regarding the following aspects: CQI distribution, PRB utilization distribution and/or available carrier frequencies. The historical data regarding these aspects may then be used in a network simulator as an input and for different pairs of thresholds ρ∈$\mathcal{R}$, where $\mathcal{R}$ is the set of all admissible thresholds. In this example, two different outputs are then produced, for a specific PSG g and each pair of thresholds ρ∈$\mathcal{R}$ such that $\bar{e}_g(\rho)$ is the estimation of the average number of inactive cells, proportional to the saved energy in comparison to when all cells are active all the time and $\bar{f}_g(\rho)$=estimation of the probability that avg UE throughput, that is average user throughput which may be understood as average throughput experienced by a terminal device, is higher than the pre-defined threshold Y [Mbps], such as Y=4 Mbps, for each pair of thresholds ρ∈$\mathcal{R}$.

It is further to be noted that in step 2, once $\bar{e}_g(\rho)$ and $\bar{f}_g(\rho)$ are estimated for all admissible thresholds ρ∈$\mathcal{R}$ and for PSG g, the restricted safe region $\mathcal{R}_g$ may be computed for example as follows: The straight line are considered to pass through the origin ρ=($\rho_{min}, \rho_{max}$)=(0,0) with $\rho_{max} > \rho_{min}$ i.e., $\rho_{max} = \alpha \rho_{min}$ where α=atan(φ) with $$\frac{\pi}{4} < \phi < \frac{\pi}{2}.$$

For each line with inclination $\phi$, a safe auxiliary region $\mathcal{R}_g(\phi)$ is defined as the set of thresholds with probability that throughput is higher than threshold Y and close enough to the target X. This may be formulated as $\mathcal{R}_g(\phi)=\{\rho: \rho_{max}=\text{atan}(\phi)\ \rho_{min}\ \text{and}\ |f_g(\rho)-X|<\epsilon\}$ where $\epsilon$ can be pre-defined as input (e.g., $\epsilon=0.02$) and it may be used to define the risk-sensitivity in terms of throughput (i.e., QoS): lower $\epsilon$ allows to restrict the search region, with potentially lower energy savings but with better QoS performance. Therefore, the line inclination $\phi_g$ guaranteeing the highest potential saved energy may be chosen using the following formula:

$$\phi_g = \underset{\phi}{\arg\max} \sum_{\rho \in \mathcal{R}_g(\phi)} e_g(\rho)$$

and the safe search region for PSG g may be defined as the auxiliary region in correspondence of the selected angle $\phi_g$: $\mathcal{R}_g = \mathcal{R}_g(\phi_g)$.

This way the safe region $\mathcal{R}_g$ comprises only safe thresholds, which helps to guarantees that the throughput of a terminal device is sufficiently close to the target, namely:

Pr(avg UE throughput($\rho$)>Y Mbps)≈X, $\forall \rho \in \mathcal{R}_g$

This also helps to guarantee that the throughput actually experienced during online exploration is not too low with respect to the target X.

A further advantage is that as mentioned above, across safe region $\mathcal{R}_g$ thresholds jointly increase and thus along that direction the amount of saved energy increases, and the throughput degrades, that is Pr(avg UE throughput($\rho$)>Y Mbps) decreases. Thus, in order to maximize saved energy, it is sufficient to search for the threshold $\rho \in \mathcal{R}_g$ that achieves exactly Pr(avg UE throughput($\rho$)>Y Mbps)=X; not higher, since more energy can be saved and not lower, since QoS constraint would be violated. Thus, step 2 allows simplification the problem at hand and enables considering only the throughput as the only target to aim at and the energy saving maximization naturally follows as a side product.

Next, in the exemplary embodiment of FIG. 4, in step 3, S3, the thresholds may be fine-tuned as part of online process. This optimization may be implemented within RIC or in some exemplary embodiments, within EdenNet, and it chooses the next threshold $\rho_i$ to be deployed, aiming to track the time-varying optimal thresholds $\rho^*$ that achieve: Pr(avg UE throughput($\rho^*$)>Y Mbps)=X with e.g. Y=4, X=0.95.

As one of the advantages achieved by step 2 is simplifying the problem, the online threshold search may focus on the avg throughput of a terminal device, and ensure that at all times the probability of the throughput is higher than the threshold Y (e.g., Y=4 Mbps) and is equal to the target probability X (e.g., X=95%), i.e., Pr(avg UE throughput($\rho$)>Y Mbps)=X.

During the optimization, the following aspects are to be considered: The function $f(\rho)$=Pr(avg UE throughput($p\rho$)>Y Mbps) may be unknown and thus it is to be observed whether, after deploying thresholds $\rho$, the resulting throughput was actually >Y Mbps, and estimate $f(\rho)$ accordingly. Also, if the target probability X is high (e.g., >98%) a considerable number of samples, such as at least >$10^3$ samples, could be needed to accurately estimate $f(\rho)$ using statistical methods such as Wilson/Jeffreys/Clopper-Pearson confidence intervals. If for example 10 samples would then be collected per one hour, assuming that counter collection is every T=15 minutes and approximately 3 cells per PSG, the thresholds would not be modifiable for at least weeks, which would affect the convergence time of the algorithm and its ability to follow up on environmental changes. Therefore, it is beneficial to estimate the value $f(\rho)$ with considerable fewer samples and based on a Bayesian approach. In step 3, the unknown function $f$ may be parametrized. This may be performed only at first iteration i=0. $f_\theta(r)$ may be chosen as a parametrized version of the true $f(\rho)$ function, in which

- $r \in [0; 1]$ parametrizes the safe region $\mathcal{R}_g$: r=0 corresponds to lower-left point, r=1 is the top-right point, and $r \in (0; 1)$ anything in between
- $\theta$ characterizes the shape of $f_\theta$. For example, if $f_\phi$ is a linear function, then:
  - $f_\theta(r) = a - br$, where $\theta=[a, b]$. Note that b>0 since $f_\theta$ is a decreasing function such that throughput degrades as thresholds increase.

Also in step 3, there may be prior belief on parameters $\theta$ at first iteration i=0. Offline computation may already provide an estimation of the unknown function $f$, that may be referred to as $\bar{f}$. $\bar{\theta}$ may be the value of parameters $\theta$ that best approximate $\bar{f}$:

$$\bar{\theta} = \arg\min_{\theta} \|\bar{f} - f_\theta\|$$

The prior belief $\text{Pr}(\theta_0)$ may then be defined on the parameters $\theta$ as a normal multi-variate distribution having $\bar{\theta}$ as mean vector and $\sigma I$, in which I is the identity matrix as covariance matrix, meaning that parameters are initially independent and each with variance $\sigma$. It is to be noted that a may be user-defined and for example $\sigma=0.05$.

Step 3 may also comprise updating belief on parameters $\theta$. At iteration i=1,2, ... throughput counters may be collected every T [minutes] for a specific threshold $\rho_i$ that may be parameterized as $r_i$. Call $y_i=[y_i^{(1)}, \ldots y_i^{(m_i)}]$, where $y_i^{(m)}$ denotes whether the m-th thpt sample associated to $r_i$ is $\geq$Y Mbps. $Y_i=[y_1, \ldots, y_i]$ may be for all observations up to iteration i. Then the belief on parameters $\theta$ may be updated via Bayes theorem:

$$Pr(\theta_i | Y_i) = Pr(\theta_i | y_i, Y_i) = \frac{Pr(y_i | \theta_i, Y_{i-1}) \times Pr(\theta_i | Y_{i-1})}{Pr(y_i | Y_{i-1})}$$

$$= \frac{Pr(y_i | \theta_i) \times \int_{\theta_{i-1}} Pr(\theta_{i-1} | Y_{i-1}) Pr(\theta_i | \theta_{i-1}) d\theta_{i-1}}{Pr(y_i | Y_{i-1})}$$

such that $\text{Pr}(\theta_i|\theta_{i-1})$ is the transition law according to which the unknown thput function f(.) evolves over time, due to varying network conditions. $\text{Pr}(\theta_i|\theta_{i-1})$ may be set to a normal variable with zero mean, diagonal covariance matrix and fixed variance (e.g., 0.01). This choice may allow to quickly react to variations. The likelihood of observations is then $\text{Pr}(y_i|\theta_i) \varnothing_i f_\sigma(r_i)^{\Sigma_m y_i^{(m)}} (1 - f_\sigma(r_i))^{m_i - \Sigma_m y_i^{(m)}}$.

Step 3 may further comprise choice for the next threshold. At iteration i=1,2, ..., the threshold $r_i$ that achieves, on average, the target probability with respect to the current belief may be chosen using the formula:

$\mathbb{E}[f_\sigma(r_i)] = X$ where expectation $\mathbb{E}$ is wrt the posterior $\text{Pr}(\theta_i|Y_i)$ determined as described above.

The online threshold exploration procedure described above may have the following advantages: adapting to changing environments. As relatively few throughput samples, for example 40, corresponding to 4/5 hours of KPI collection, every T=15 minutes, are required to estimate $f(r_t)$ well, thresholds can be updated at higher frequency than frequentist methods, such as every 4/5 hours instead of weeks, which allows to track more closely the variation of the optimal threshold. Thus, the optimal thresholds may be determined in accordance with changes that occur in the environment. The changes may comprise for example changes in the location of terminal devices being served, changes in CQI distribution and the evolution of traffic density from day to day. Also, long term and shot term throughput for a terminal device may be guaranteed. As the adaptation to the changes is fast, throughput may be guaranteed also in short term, such as one day, thereby avoiding sudden drops in performance.

Next, in the exemplary embodiment of FIG. 4, in step 4, S4, the determined thresholds $\rho_i$, that are now the pre-determined thresholds, are communicated by the OTT node that controls the access nodes of PSG g. In other words, the determined thresholds are provided to the network for deployment by providing them to a central entity of the network, such as an ES xApp in the RIC, that then controls the access nodes comprised in the network. After this in step 5, S5, while the thresholds are deployed, key performance indicators, KPIs, such as average throughput, are collected by the OTT node at fixed period T, such as T=15 mins. Average throughput may be a throughput determined for a terminal device that can be referred to as a generic terminal device by for example dividing the cell throughput by the number of connected terminal devices. So instead of determining the average throughput for a particular terminal device, it is estimated as a generic KPI.

As the thresholds can be updated, in S6 it is determine if a change has been detected and if yes, then the optimization proceeds to step 1 again. A change may also be understood as a pre-determined time having passed by and therefore causing the need to re-do to perform the optimization. If the change was not detected and not enough time has passed for re-doing the offline steps of S1 and S2, then the optimization process returns to step 3, S3.

Figure 5:
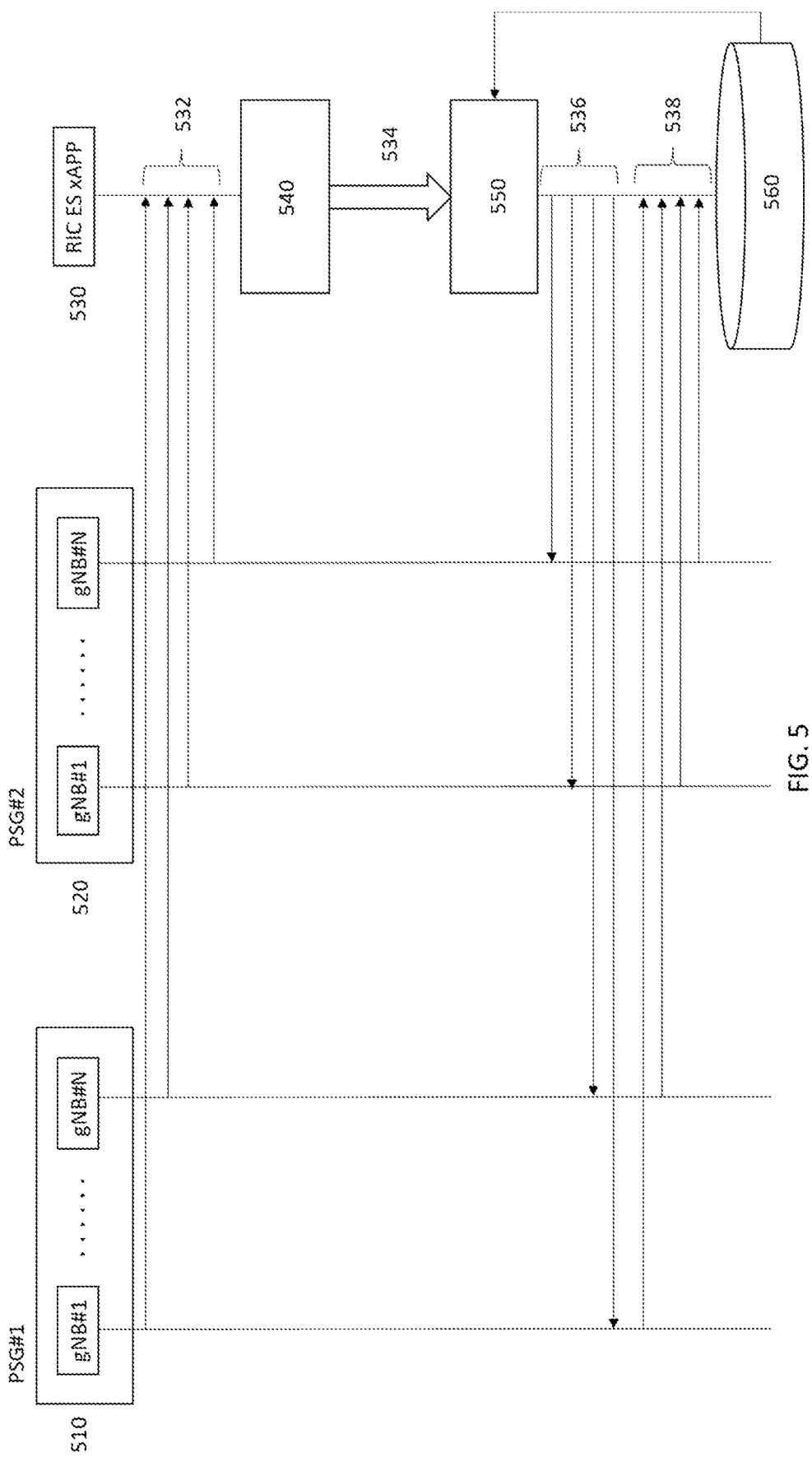
FIG. 5 illustrates an exemplary network-level view of apparatuses for and with which the optimization process described above may be performed.

FIG. 5 illustrates an exemplary network-level view of apparatuses for and with which the optimization process described above may be performed. In this exemplary embodiment, there are two PSGs, 510 and 520. Both PSGs comprise a plurality of access nodes, such as gNBs, each. The access nodes provide, using an E2 interface for example, historical data 532 to RIC in which the energy savings optimization is performed as an xApp 530. The xApp 530 then performs the offline part comprising steps 1 and 2 in 540 and as an output, a region 534 is determined and the optimization may continue with the online part comprising the step 3 in 550. As part of step 4, the deployment 536 in then provided to the access nodes using the E2 interface. Using the E2 interface, also KPIs are collected 538 from the access nodes and collected as a KPI dataset 560 that may then be provided as input for step 3 that is performed in 550.

Figure 6B:
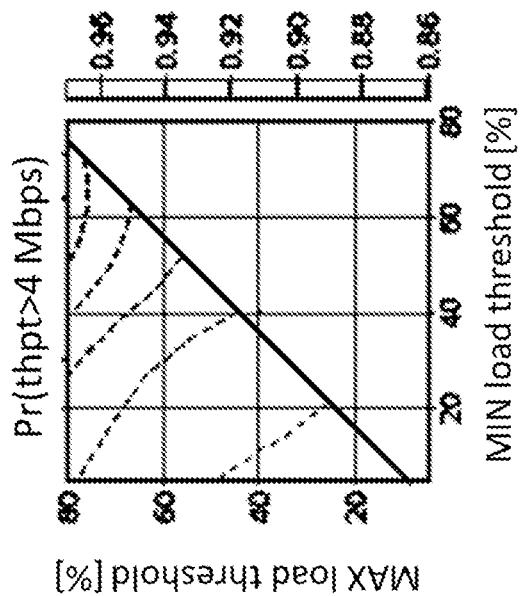
FIG. 6A-6E illustrates graphs regarding simulation results.
Figure 6A:
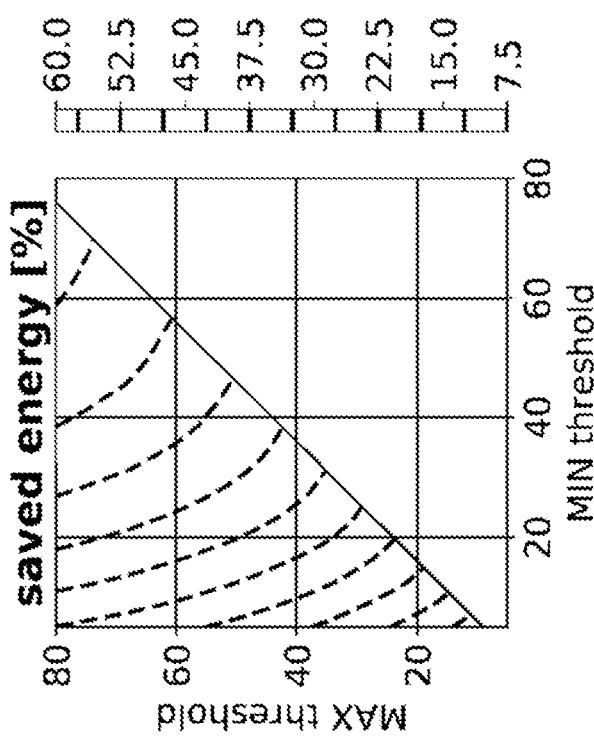

FIG. 6A illustrates a graph that depicts estimated saved energy $\bar{e}_g$ of each threshold pair $\rho$ in a PSG. FIG. 6B illustrates a graph that depicts simulated estimation of the probability $\bar{f}_g(\rho)$ that the average throughput of a terminal device is higher than 4 Mbps for each possible threshold pair $\rho$ in a PSG. Input dataset used for obtaining this graph comprises PRB utilization, CQI, carrier frequency and throughput.

Figure 6C:
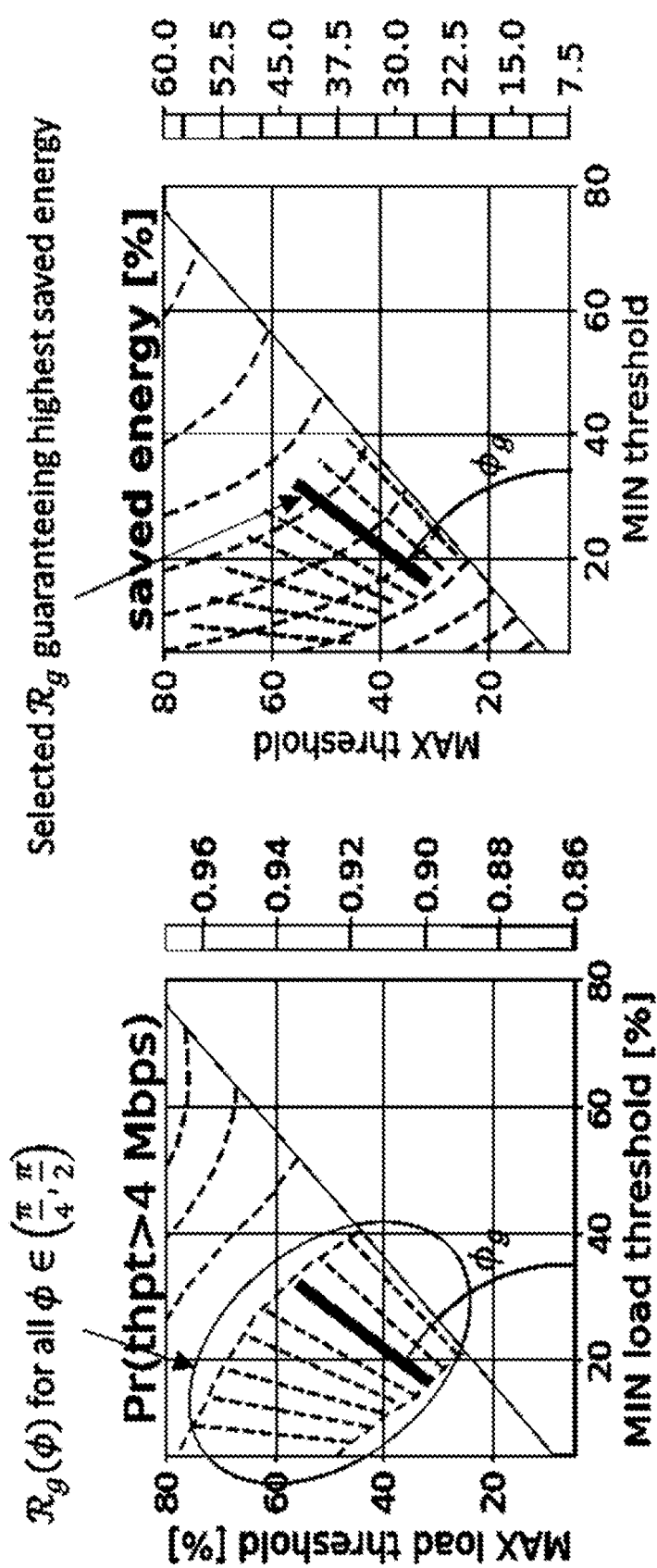

FIG. 6C illustrates graphs that depict determining a safe search region $\mathcal{R}_g$. $\mathcal{R}_g(\phi)$ is first defined as the set of thresholds lying on the line through the origin and with inclination $\phi$ with throughput performance $\bar{f}_g(\rho)$ sufficiently close to the target X (left hand-side). The best inclination is then chosen to achieve the highest energy saving performance (right hand-side).

Figure 6E:
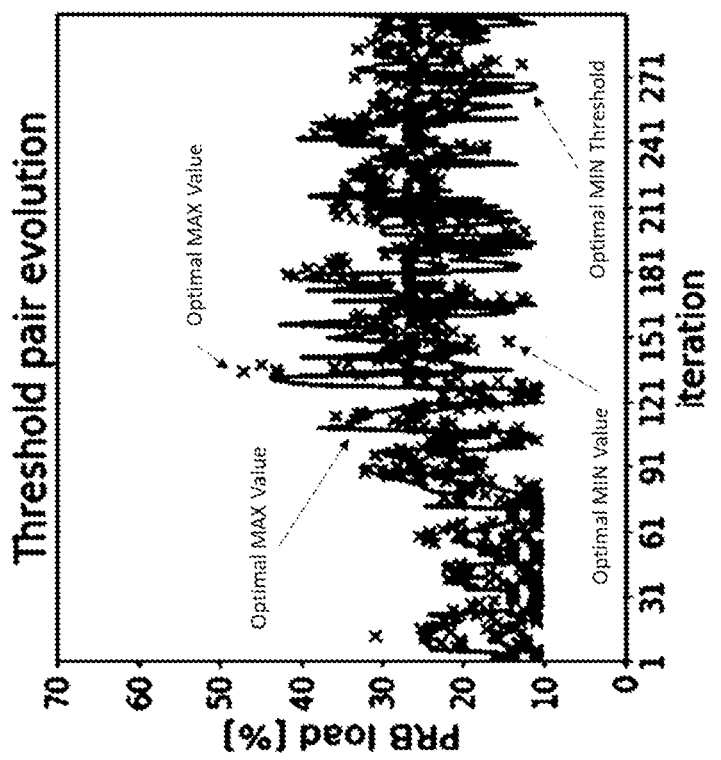
Figure 6D:
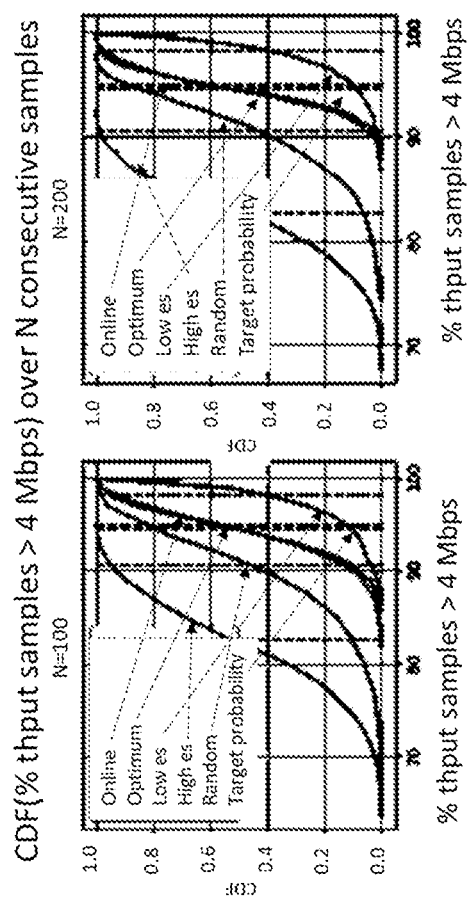

FIG. 6D and 6E illustrate simulation results regarding the online phase of the optimization process that was described above. The performance of online procedure is, in these graphs, compared against four strategies. First, an optimal strategy serves as a benchmark. In the optimal strategy, at each iteration the thresholds guaranteeing Pr(thpt>4 Mbps)=95% are chosen. Then, a random strategy in which at each iteration one threshold pair uniformly at random within the search region $\mathcal{R}_g$ is chosen is used. Thirdly, lowest thresholds strategy that always chooses the lowest thresholds in the search region (r=0), guaranteeing the highest throughput but achieving the lowest energy savings is used. Finally, highest threshold strategy that always chooses the highest thresholds in the search region (r=1), guaranteeing the highest energy savings but incurring the lowest throughput is used.

In FIG. 6D the online procedure manages to track the optimal thresholds that evolve over time, and the long-term average of portion of throughput samples being higher than the threshold 4 Mbps converges to the target probability, for example 95%, in this case. Also, the average energy saved by our online procedure is close to the optimal one, by a <1% gap.

In FIG. 6E it is illustrated that even in the short term, such as 0.5 or 1 day, throughput performance never drops too low with respect to the target probability that is for example 95%, highlighting that the algorithm used in the optimization chooses good thresholds in a consistent manner and is able to adaptively keep up with varying network conditions.

Figure 7:
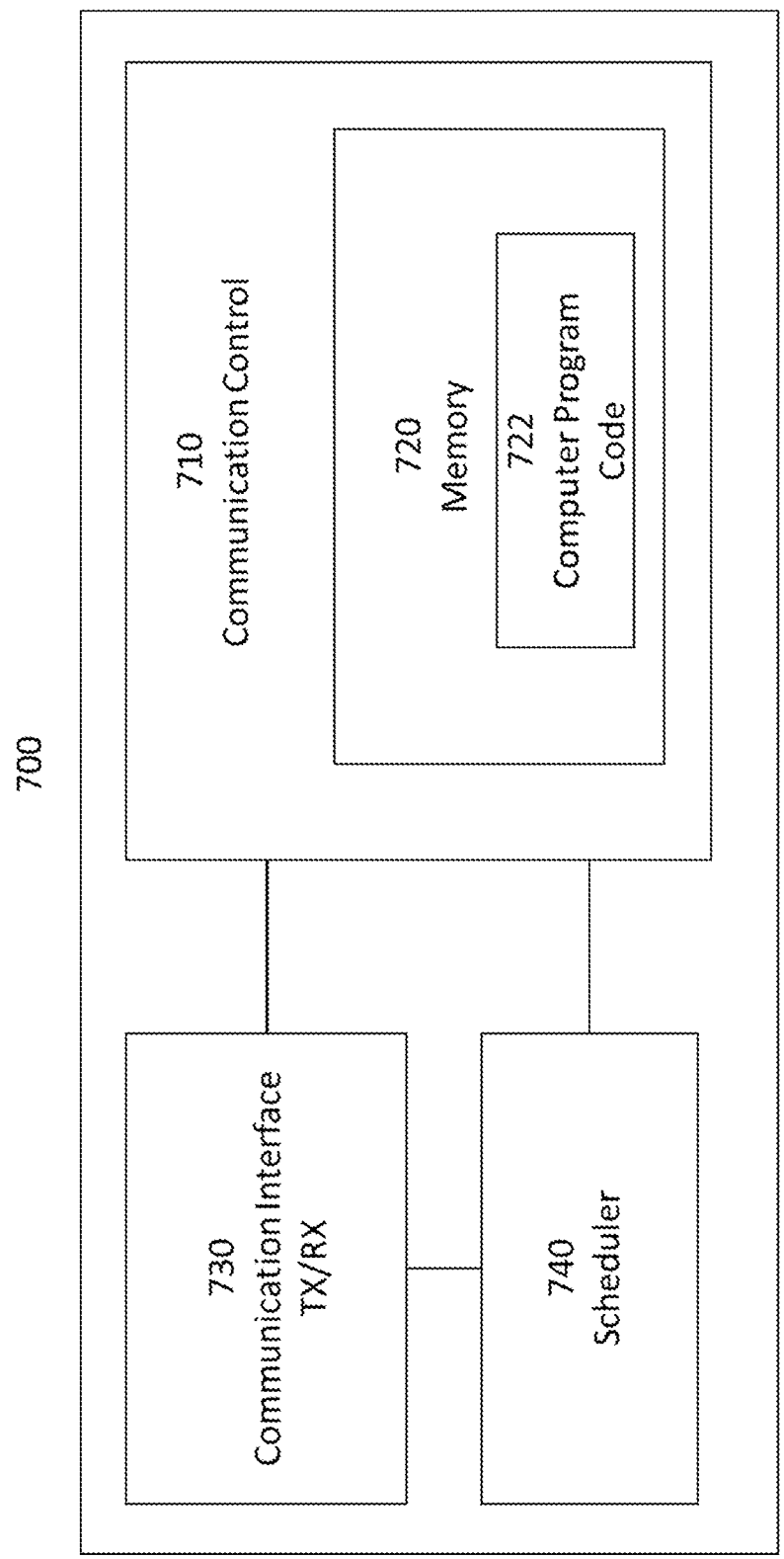
FIG. 7 illustrates an exemplary embodiment of an apparatus.

The apparatus 700 of FIG. 7 illustrates an example embodiment of an apparatus that may be an access node or be comprised in an access node. The apparatus may be, for example, a circuitry or a chipset applicable to an access node to realize the described embodiments. The apparatus 700 may be an electronic device comprising one or more electronic circuitries. The apparatus 700 may comprise a communication control circuitry 710 such as at least one processor, and at least one memory 720 including a computer program code (software) 722 wherein the at least one memory and the computer program code (software) 722 are configured, with the at least one processor, to cause the apparatus 700 to carry out any one of the example embodiments of the access node described above.

The memory 720 may be implemented using any suitable data storage technology, such as semiconductor-based memory devices, flash memory, magnetic memory devices and systems, optical memory devices and systems, fixed memory and removable memory. The memory may comprise a configuration database for storing configuration data. For example, the configuration database may store current neighbour cell list, and, in some example embodiments, structures of the frames used in the detected neighbour cells.

The apparatus 700 may further comprise a communication interface 730 comprising hardware and/or software for realizing communication connectivity according to one or more communication protocols. The communication interface 730 may provide the apparatus with radio communication capabilities to communicate in the cellular communication system. The communication interface may, for example, provide a radio interface to terminal devices. The apparatus 700 may further comprise another interface towards a core network such as the network coordinator apparatus and/or to the access nodes of the cellular communication system. The apparatus 700 may further comprise a scheduler 740 that is configured to allocate resources.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus, comprising:
    at least one processor; and
    at least one memory including a computer program code, wherein the at least one memory and the computer program code are configured, with the at least one processor, to cause the apparatus to:
    obtain historical data from a plurality of access nodes comprised in a network;
    determine, for at least one of the plurality of access nodes, a region comprising a set of values for threshold pairs that comprise minimum and maximum threshold pairs;
    determine, from the region, one threshold pair, wherein the threshold pair defines pre-determined thresholds for determining if a cell is to be switched on or switched off;
    determine the one threshold pair by estimating a value for a function that determines values with which a probability that an average user throughput is higher than a pre-determined threshold is equal to a pre-determined value and the value for the function is estimated using a Bayesian approach;
    provide the threshold pair to the network for deployment; and
    collect data regarding at least one key performance indicator from the plurality of access nodes.

2. The apparatus according to claim 1, wherein the historical data comprises one or more of the following: average throughput, physical resource block utilization, carrier frequency, average channel quality indicator and time stamps of a time window over which the data is averaged.

3. The apparatus according to claim 1, wherein the apparatus is further caused to obtain the historical data from the plurality of access nodes and determine the region comprising the set of values for threshold pairs that comprise minimum and maximum threshold pairs again after a pre-determined time period has passed and/or based on a triggering event.

4. The apparatus according to claim 1, wherein the region is a subset of all admissible thresholds, wherein the subset comprises elements sortable such that minimum and maximum thresholds are both non-decreasing.

5. The apparatus according to claim 1, wherein the apparatus is caused to obtain the historical data from the plurality of access nodes and determine the region, that is a search region, comprising the set of values for threshold pairs that comprise a minimum and maximum threshold pairs offline.

6. The apparatus according to claim 1, wherein the apparatus is further caused to determine the region individually for each access node comprised in the plurality of access nodes.

7. The apparatus according to claim 1, wherein the apparatus is comprised in or connected to an over the top node.

8. A method, comprising:
    obtaining historical data from a plurality of access nodes comprised in a network;
    determining, for at least one of the plurality of access nodes, a region comprising a set of values for threshold pairs that comprise minimum and maximum threshold pairs;
    determining, from the region, one threshold pair, wherein the threshold pair defines pre-determined thresholds for determining if a cell is to be switched on or switched off;
    determining the one threshold pair by estimating a value for a function that determines values with which a probability that an average user throughput is higher than a pre-determined threshold is equal to a pre-determined value and the value for the function is estimated using a Bayesian approach;
    providing the threshold pair to the network for deployment; and
    collecting data regarding at least one key performance indicator from the plurality of access nodes.

9. The method according to claim 8, wherein the method further comprises obtaining the historical data from the plurality of access nodes and determining the region comprising the set of values for threshold pairs that comprise minimum and maximum threshold pairs again after a pre-determined time period has passed and/or based on a triggering event.

10. The method according to claim 8, wherein the region is a subset of all admissible thresholds, wherein the subset comprises elements sortable such that minimum and maximum thresholds are both non-decreasing.

11. The method according to claim 8, wherein the method further comprises obtaining the historical data from the plurality of access nodes and determining the region, that is a search region, comprising the set of values for threshold pairs that comprise a minimum and maximum threshold pairs offline.

12. The method according to claim 8, wherein the method further comprises determining the region individually for each access node comprised in the plurality of access nodes.

13. The method according to claim 8, wherein the historical data comprises one or more of the following: average throughput, physical resource block utilization, carrier frequency, average channel quality indicator and time stamps of a time window over which the data is averaged.

14. A non-transitory computer readable medium comprising program instructions for causing an apparatus to perform at least the following:
    obtain historical data from a plurality of access nodes comprised in a network;
    determine, for at least one of the plurality of access nodes, a region comprising a set of values for threshold pairs that comprise minimum and maximum threshold pairs;
    determine, from the region, one threshold pair, wherein the threshold pair defines pre-determined thresholds for determining if a cell is to be switched on or switched off;
    determine the one threshold pair by estimating a value for a function that determines values with which a probability that an average user throughput is higher than a pre-determined threshold is equal to a pre-determined value and the value for the function is estimated using a Bayesian approach;

provide the threshold pair to the network for deployment; and collect data regarding at least one key performance indicator from the plurality of access nodes.

15. The non-transitory computer readable medium according to claim 14, wherein the apparatus is further caused to obtain the historical data from the plurality of access nodes and determine the region comprising the set of values for threshold pairs that comprise minimum and maximum threshold pairs again after a pre-determined time period has passed and/or based on a triggering event.

16. The non-transitory computer readable medium according to claim 14, wherein the region is a subset of all admissible thresholds, wherein the subset comprises elements sortable such that minimum and maximum thresholds are both non-decreasing.

17. The non-transitory computer readable medium according to claim 14, wherein the apparatus is caused to obtain the historical data from the plurality of access nodes and determine the region, that is a search region, comprising the set of values for threshold pairs that comprise a minimum and maximum threshold pairs offline.

18. The non-transitory computer readable medium according to claim 14, wherein the apparatus is further caused to determine the region individually for each access node comprised in the plurality of access nodes.

19. The non-transitory computer readable medium according to claim 14, wherein the apparatus is comprised in or connected to an over the top node.

20. The non-transitory computer readable medium according to claim 14, wherein the historical data comprises one or more of the following: average throughput, physical resource block utilization, carrier frequency, average channel quality indicator and time stamps of a time window over which the data is averaged.

* * * * *